(12) United States Patent
Jordan et al.

(10) Patent No.: US 7,265,524 B2
(45) Date of Patent: Sep. 4, 2007

(54) ADAPTIVE CONTROL FOR INDUCER BASED BUCK-BOOST VOLTAGE REGULATORS

(75) Inventors: Mark G. Jordan, New Boston, NH (US); James Edward Wells, Merrimack, NH (US)

(73) Assignee: Linear Technology Corporation, Milpitas, CA (US)

( * ) Notice: Subject to any disclaimer, the term of this patent is extended or adjusted under 35 U.S.C. 154(b) by 429 days.

(21) Appl. No.: 10/939,469

(22) Filed: Sep. 14, 2004

(65) Prior Publication Data
US 2006/0055384 A1 Mar. 16, 2006

(51) Int. Cl.
*G05F 3/16* (2006.01)

(52) U.S. Cl. ............... 323/225; 323/284; 323/290; 323/259

(58) Field of Classification Search ........... 323/222, 323/224, 225, 282, 284, 290, 259, 351
See application file for complete search history.

(56) References Cited

U.S. PATENT DOCUMENTS

| 5,481,178 | A | | 1/1996 | Wilcox et al. |
| 6,166,527 | A | * | 12/2000 | Dwelley et al. ............ 323/222 |
| 6,828,766 | B2 | * | 12/2004 | Corva et al. ................ 323/284 |

OTHER PUBLICATIONS

TEA 1211HN—Philips Semiconductors; "High Efficiency Auto-Up/Down DC/DC Converter"; *Integrated Circuits Data Sheet*; c. 2003; pp. 1-22.
Maxim Integrated Products; "2 or 3-Cell, Step-Up/Down, Two-Way Pager System IC"; c. 1998; pp. 1-16.

* cited by examiner

*Primary Examiner*—Jessica Han
(74) *Attorney, Agent, or Firm*—McDermott Will & Emery LLP

(57) ABSTRACT

Voltage regulators and methods for regulating voltages are disclosed. A switching circuit with an inductor and a plurality of switches may be used to produce a regulated voltage from an unregulated voltage source. A control circuit may be used to monitor the voltages at the input and output of the voltage regulator, and operate the switches in either a buck, boost, or buck-boost mode depending on the relationship between the voltages at the input and output of the voltage regulator.

45 Claims, 6 Drawing Sheets

ADAPTIVE CONTROL FOR INDUCER BASED BUCK-BOOST VOLTAGE REGULATORS

FIELD

The present disclosure relates to voltage regulators, and more specifically, to an adaptive control for an inductor based buck-boost voltage regulators.

BACKGROUND

One of the most common challenges in designing portable electronic devices is the generation and maintenance of a regulated voltage from an unregulated voltage source, such as a battery. Typically, a voltage regulator is used for this purpose. A voltage regulator may be designed a linear or switching device.

A linear regulator provides closed loop control to regulate the voltage at the load. This type of regulator may be used to provide a constant output voltage which has a lower magnitude than the unregulated voltage source.

A switching regulator, on the other hand, is a circuit that uses an energy-storage element, such as an inductor, to transfer energy from the unregulated power source to the load in discrete bursts. Feedback circuitry may be used to regulate the energy transfer to maintain a constant voltage at the load. Because the switching regulator operates to transfer energy in discrete bursts, it can be configured to step-up or step-down the voltage of the unregulated voltage source. Moreover, switching regulators are generally more efficient than linear regulators.

Various types of switching regulators are commonly used today in portable electronic devices. A buck converter is just one example. The buck converter is an inductor based regulator used to step-down or buck the unregulated voltage source. The boost converter, on the other hand, is an inductor based regulator used to step-up or boost the unregulated voltage source. In some applications, a buck-boost converter may be used to provide a regulated output that is higher, lower or the same as the unregulated voltage source. The buck-boost converter provides a regulated output over large variations in the unregulated voltage source, but tends to be less efficient than the buck or boost converter. Accordingly, it would be desirable to improve the efficiency of buck-boost converters.

SUMMARY

In one aspect of the present invention, a voltage regulator having an input and output includes a switching circuit having an energy-storage element and a plurality of switches configured to switch the energy-storage element to the input and output of the voltage regulator, and a control circuit configured to monitor both energy stored in the energy-storage element and voltage produced at the output of the voltage regulator, the control circuit being further configured to operate the switches in cycles when the voltage at the output of the voltage regulator falls below a threshold voltage, each of the cycles having a first phase with the energy-storage element coupled to the input, followed by a second phase with the energy-storage element coupled to the output, with the input of the voltage regulator being coupled to the output of the voltage regulator during a portion of each of the cycles, and wherein the duration of the first and second phases of each of the cycles is a function of the energy stored in the energy-storage element.

In another aspect of the present invention, a method of operating a voltage regulator to produce a regulated voltage at its output from an unregulated voltage source includes determining that the regulated voltage has fallen below a voltage threshold, operating the voltage regulator in cycles in response to the regulated voltage falling below the voltage threshold, each of the cycles having a first phase followed by a second phase, transferring energy from the unregulated voltage source to an energy-storage element in the voltage regulator during the first phase of each of the cycles, transferring energy from the energy-storage element to the output of the voltage regulator during the second phase of each of the cycles, and transferring energy from the unregulated voltage source to the output of the voltage regulator during a portion of each of the cycles, wherein the duration of the first and second phases of each of the cycles is a function of the energy stored in the energy-storage element.

In yet another aspect of the present invention, a voltage regulator having an input and output includes an energy-storage element, means for monitoring energy stored in the energy-storage element, means for monitoring a voltage at the output of the voltage regulator, means for operating the voltage regulator in cycles when the output of the voltage regulator falls below a threshold voltage, each of the cycles having a first phase with the energy-storage element coupled to the input of the voltage regulator, followed by a second phase with the energy-storage element coupled to the output of the voltage regulator, with the input of the voltage regulator being coupled to the output of the voltage regulator during a portion of each of the cycles, and wherein the duration of the first and second phases of each of the cycles is a function of the energy stored in the energy-storage element.

In a further aspect of the present invention, a voltage regulator having an input and output includes a switching circuit having an inductor, an inductor current sensor, a first switch between the input of the voltage regulator and one end of the inductor, a second switch between the one end of the inductor and a voltage return line, a third switch between the other end of the inductor and the voltage return line, and a fourth switch between the other end of the inductor and the output of the voltage regulator, and a control circuit having a voltage comparator coupled to the output of the voltage regulator, and a switch controller configured to operate the switches in cycles when the voltage comparator detects that the output of the voltage regulator has fallen below a threshold voltage, each of the cycles having a first phase with the first switch closed, followed by a second phase with the fourth switch closed, with the first and fourth switches being closed at the same time during a portion of each of the cycles, and wherein the duration of the first and second phases of each of the cycles is a function of the current sensed by the inductor current sensor.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
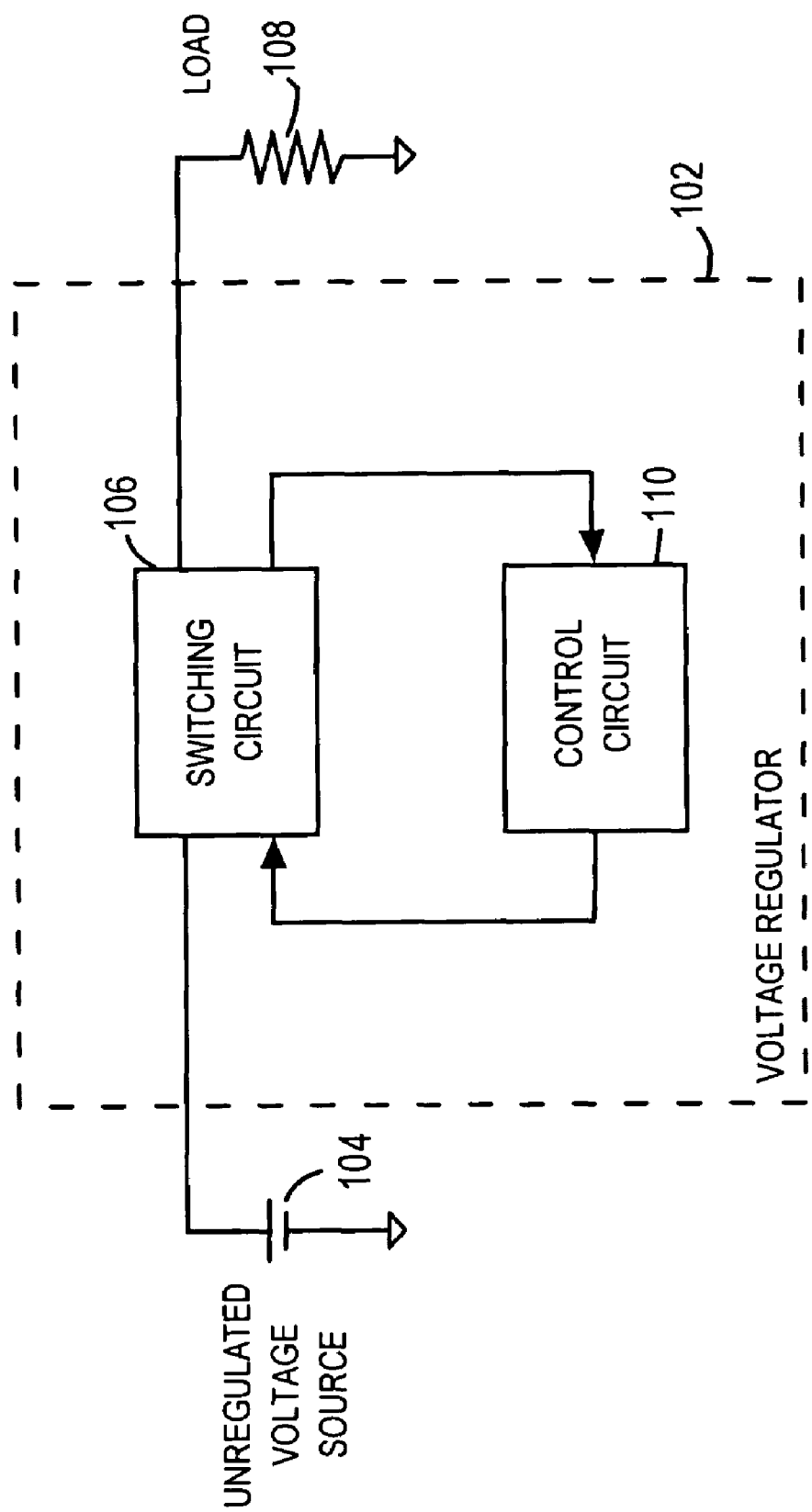
FIG. 1 is a conceptual block diagram of an embodiment of a buck-boost voltage regulator.

FIG. 1 is a conceptual block diagram of an embodiment of a buck-boost voltage regulator 102. The voltage regulator 102 may include a switching circuit 106 having an energy-storage element (not shown) to transfer energy from an unregulated voltage source 104 to a load 108. Using feedback and control circuitry, the switching circuit 106 may be used to regulate the voltage to the load 108 at any level within the operating limits of the voltage regulator 102 by controlling the manner in which energy is transferred to the load. By way of example, the switching circuit 106 may be operated by a control circuit 110 in a fixed frequency mode using pulse-width modulation techniques to regulate the voltage to the load 108. When the load is light, the switching circuit 106 may be transitioned into a hysteretic mode of operation. In the hysteretic mode, the switching circuit 106 may be idle when the voltage to the load 108 is within its regulated value, and may deliver energy to the load 108 only when the output drops out of regulation. When the switching circuit i106 is idle, the voltage regulator is said to be in the "sleep mode."

Figure 2:
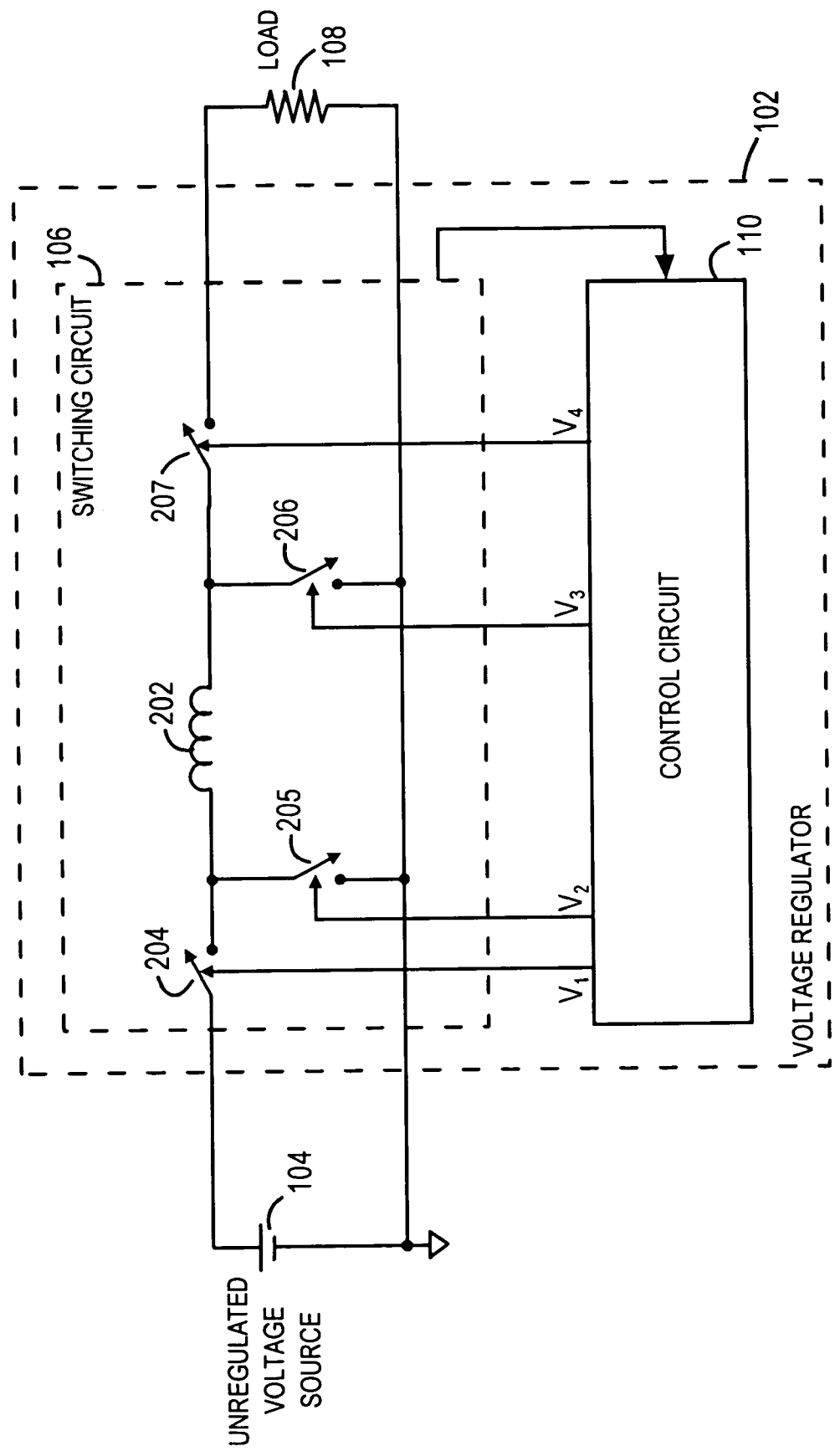
FIG. 2 is a schematic block diagram of an embodiment of a switching circuit operating in a buck-boost voltage regulator.

FIG. 2 is a schematic block diagram of an embodiment of a switching circuit operating in a buck-boost voltage regulator. The switching circuit 106 may be used to step-up or step-down the unregulated voltage source 104. This may be achieved with an energy-storage element, such as an inductor 202, that transfers energy from the unregulated voltage source 104 to the load 108 in discrete bursts through four switches 204-207 operated by the control circuit 110. The manner in which the switches 204-207 are operated may vary depending on the specific application and the overall design constraints. One example will now be described.

Initially, the voltage from the unregulated voltage source, or the input voltage ($V_{in}$) to the voltage regulator, may be applied across the inductor 202 by closing the first and third switches 204, 206, and opening the second and fourth switches 205, 207. This causes the current through the inductor 202 to rise with time. Once the inductor 202 reaches a peak current $I_{peak}$, the energy stored in the inductor 202 may be transferred to the output of the voltage regulator 102 by opening the first and third switches 204, 206, and closing the second and fourth switches 205, 207. When this occurs, the inductor current continues to flow in the same direction because inductor current cannot change instantaneously. That is, the inductor 202 becomes a current source for the load. The polarity of the voltage across the inductor 202 is switched instantaneously to whatever voltage is required to maintain current flow. The inductor current decreases with time until there is no longer any current flowing through the inductor. If this process is repeated, the output voltage will rise with every cycle.

Figure 3:
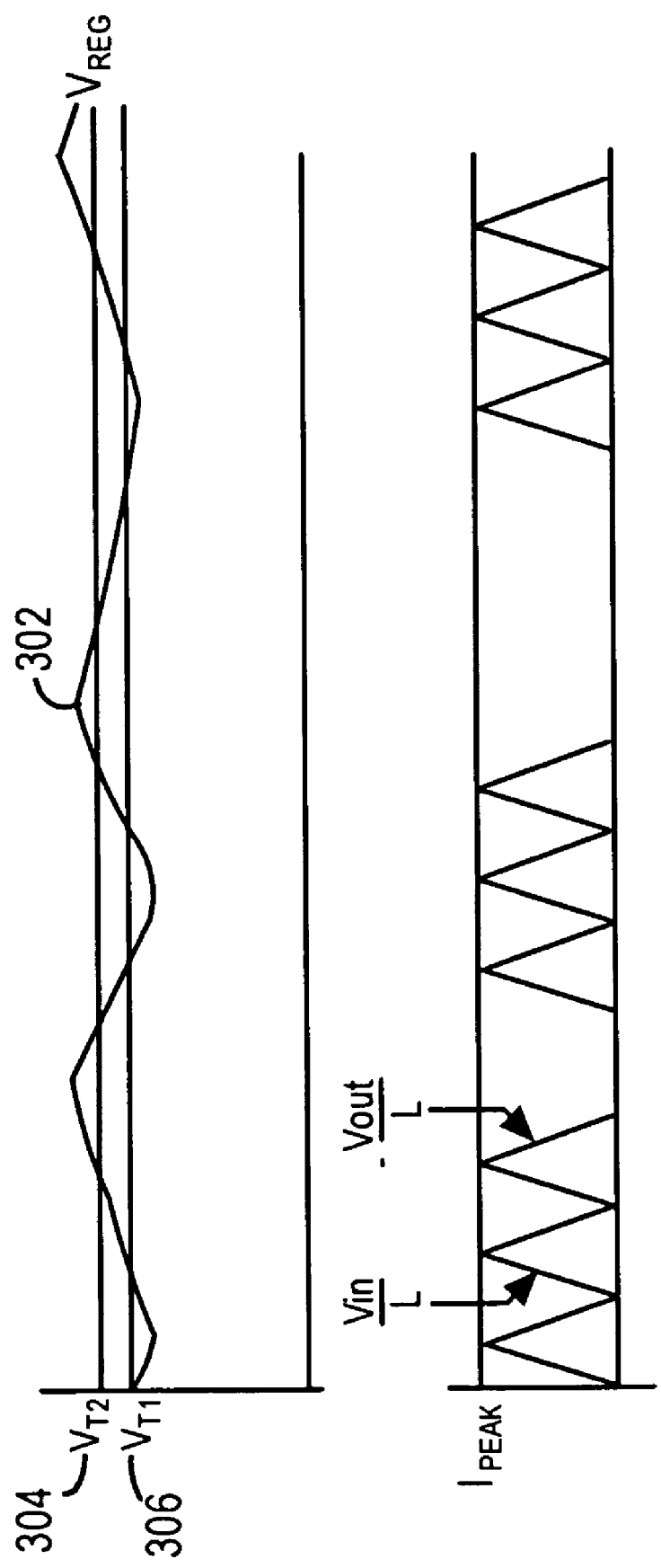
FIG. 3 is a timing diagram illustrating the operation of an embodiment of a buck-boost voltage regulator in the hysteretic mode.

FIG. 3 is a timing diagram illustrating the operation of an embodiment of a voltage regulator in the hysteretic mode. The lower graph shows the current waveform of the inductor. The upper graph shows how the regulated voltage 302 at the output of the voltage regulator varies with time. When the regulated voltage 302 drops below a wake-up threshold $V_{T1}$ 304, energy from the unregulated voltage source is transferred to the load in bursts. In the example shown in FIG. 3, it takes three energy bursts, or three cycles, to increase the regulated voltage 302 to a sleep threshold voltage $V_{T2}$ 306. Once the regulated voltage 302 reaches the sleep threshold voltage $V_{T2}$ 306, the voltage regulator is forced into the sleep mode. In the sleep mode, the control circuit may be used to open all the switches in the switching circuit, thereby maintaining the voltage regulator in a low current state. The voltage regulator remains in the sleep mode until the regulated voltage 302 once again drops below the wake-up threshold $V_{T1}$ 304. This process is repeated three times in FIG. 3. The wake-up threshold voltage $V_{T1}$ 304 is shown in FIG. 3 to be lower than the sleep threshold $V_{T2}$ 306. This results in an element of hysteresis being injected into the operation of the voltage to avoid intermittent wake-up and sleep operation when the regulated voltage is close to its regulated value.

The operation of the voltage regulator in connection with one cycle in the wake-up mode will now be discussed in connection with FIG. 3. Initially, the regulated voltage 302 is shown falling below the wake-up threshold $V_{T1}$. This causes the voltage regulator to wake up and begin transferring energy to the output. The switching circuit may be used to connect the inductor to the unregulated voltage source causing the inductor current to rise with time at a rate that is proportional to the input voltage divided by the inductance ($V_{in}/L$) 308. The inductor current continues to rise until it reaches a peak inductor current $I_{peak}$. Once the inductor reaches the peak current $I_{peak}$, the switching circuit may connect the inductor to the output causing inductor current to flow through the load. The voltage across the inductor changes instantaneously to $-V_{out}$ to maintain current flow. The inductor current decreases at a rate proportional to $-V_{out}/L$ 310 until there is no longer any current flowing through the inductor.

In the embodiment of the voltage regulator discussed thus far, the switching circuit is operated by the control circuit in the same manner regardless of whether the unregulated voltage source is higher, lower or substantially equal to the regulated voltage. Alternatively, the control circuit may operate the switching circuit in a buck mode, boost mode, or buck-boost mode depending on the input voltage to the switching circuit and the output voltage of the voltage regulator.

Figure 4:
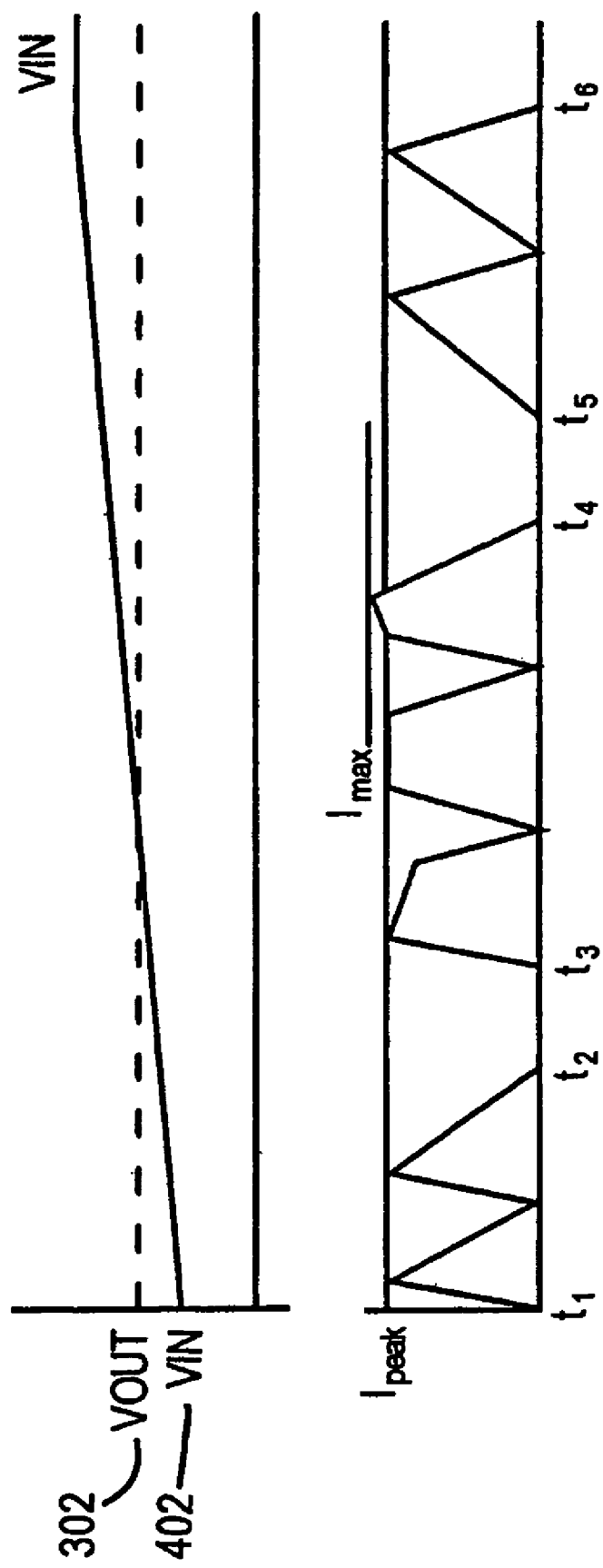
FIG. 4 is a timing diagram illustrating the operation of another embodiment of a buck-boost voltage regulator in the hysteretic mode.

FIG. 4 is a timing diagram illustrating the operation of another embodiment of a voltage regulator in the hysteretic mode. In this embodiment, the control circuit operates the switching circuit in the buck, boost or buck-boost mode. The upper graph shows the relationship between the unregulated voltage source 402 and the regulated voltage 302 of the switching circuit. The lower graph shows the current waveform of the inductor.

Referring to FIGS. 2 and 4, the switching circuit 106 may be operated in the boost mode at t1 because the regulated voltage 302 is higher than input voltage from the unregulated voltage source 104. The input voltage from the unregulated voltage source 104 may be applied across the inductor 202 in the phase of the cycle by closing the first and third switches 204, 206, and opening the second and fourth switches 205, 207. This causes the current through the inductor 202 to ramp up at a rate that is proportional to the input voltage divided by the inductance (Vin/L). Once the inductor 202 reaches the peak current Ipeak, the energy stored in the inductor 202 may be transferred to the output of the voltage regulator 102 in the second phase of the cycle by opening the third switch 206 and closing the fourth switch 207 while keeping the first switch 204 closed. When this occurs, the inductor current flows through the load 108. The inductor current decreases at a rate that is proportional to the inductor voltage divided by the inductance (-VL/L) until there is no longer any current flowing through the inductor 202. However, in this case, the inductor voltage VL is equal to the input voltage Vin minus the output voltage Vout, resulting in a slower discharge rate for the inductor current. This slower discharge rate translates into a more efficient transfer of energy because the unregulated voltage source 104 is connected directly to the load 108 through the inductor 202. As shown in FIG. 4, this process is repeated twice until the regulated voltage 302 exceeds its regulated value at t2.

Once the regulated voltage 302 reaches or exceeds its regulated value, the switching circuit 106 may be forced into the sleep mode. The switching circuit 106 remains in the sleep mode until the regulated voltage 302 drops again below its regulated value at $t_3$. Once this occurs, the switching circuit 106 wakes up and begins transferring energy to the load 108. This time, however, the input voltage 402 from the unregulated voltage source 104 is substantially equal to the regulated voltage 302 at the output to the voltage regulator 102. As result, the control circuit 108 forces the switching circuit 106 into the buck-boost mode.

In the buck-boost mode, at $t_3$, the input voltage from the unregulated voltage source 104 may be applied across the inductor 202 in the first phase of the cycle by closing the first and third switches 204, 206, and opening the second and fourth switches 205, 207. This causes the current through the inductor 202 to ramp up at a rate that is proportional to the input voltage divided by the inductance ($V_{in}$/L). Once the inductor 202 reaches the peak current $I_{peak}$, the energy stored in the inductor 202 may be transferred to the output of the voltage regulator 102 by closing the first and fourth switches 204, 207, and opening the second and third switches 205, 206. When this occurs, the inductor current flows through the load. The current through the inductor decreases at a rate that is proportional to the inductor voltage divided by the inductance ($-V_L$/L). In this case, the rate of discharge is extremely slow because the inductor voltage $V_L$, which is the difference between the input and output voltage $V_{in}$, $V_{out}$, is negligible. Accordingly, the control circuit 110 may be configured to open the first switch 204 and close the second switch 205 in the switching circuit 106 in the second phase of the cycle after a certain period of time to increase the discharge rate, thereby allowing the inductor current to reach zero current quicker. In particular, the voltage across the inductor 202 changes instantaneously to $-V_{out}$ when the first switch 204 is opened and the second switch 205 is closed causing the current flowing through the inductor to decrease at a rate proportional to ($-V_{out}$/L).

Once there is no longer any current flowing through the inductor 202, the input voltage from the unregulated voltage source 104 may, again, be applied across the inductor 202 in the first phase of a new cycle by closing the first and third switches 204, 206, and opening the second and fourth switches 205, 207. This causes the current through the inductor 202 to ramp up until the peak current $I_{peak}$ is reached. Once this occurs, energy stored in the inductor 202 may be transferred to the output of the voltage regulator 102 in the second phase of the cycle by closing the first and fourth switches 204, 207, and opening the second and third switches 205, 206, thereby causing inductor current to flow through the load. However, in this case, the regulated voltage $V_{out}$ has slightly increased from the last energy burst to a level that is substantially equal to the input voltage $V_{in}$ from the unregulated voltage source 104. As a result, there is no voltage drop across the inductor 202. Since the current through the inductor decreases at a rate that is proportional to the inductor voltage divided by the inductance ($-V_L$/L), which in this case is zero, the current flowing through the inductor 202 remains constant. In order to allow the current in the inductor to decrease in the second phase of the cycle, the control circuit 110 opens the first switch 204 and closes the second switch 205 in the switching circuit 106 after a certain period of time. Once this occurs, the voltage across the inductor 202 changes instantaneously to $-V_{out}$ causing the current flowing through the inductor to decrease at a rate proportional to ($-V_{out}$/L).

Once there is no longer any current flowing through the inductor 202, the input voltage from the unregulated voltage source 104 may, again, be applied across the inductor 202 in the first phase of the third cycle by closing the first and third switches 204, 206, and opening the second and fourth switches 205, 207. This causes the current through the inductor 202 to ramp up until the peak current $I_{peak}$ is reached, at which time, the energy stored in the inductor 202 may be transferred to the output of the voltage regulator 102 in the second phase of the cycle by closing the first and fourth switches 204, 207, and opening the second and third switches 205, 206. However, in this case, the regulated voltage $V_{out}$ has increased from the last energy burst to a level that is higher than the input voltage $V_{in}$ from the unregulated voltage source 104, and as a result, the inductor current increases with time at a rate that is proportional to the difference between the input and output voltage divided by the inductance $-(V_{in}-V_{out})$/L. The current through the inductor increases because ($V_{in}-V_{out}$) is a negative number. The current through the inductor 202 continues to rise until a maximum current ($I_{max}$) is reached or a fixed time period expires, whichever occurs first. In this example, the control circuit 110 opens the first switch 204 and closes the second switch 205 in the switching circuit 106 in the second phase of the cycle when the inductor current reaches the maximum current $I_{max}$. Once this occurs, the voltage across the inductor 202 changes instantaneously to $-V_{out}$ causing the current flowing through the inductor to decrease at a rate that is proportional to $(-V_{out}/L)$.

The inductor current continues to decrease until there is no longer any current flowing through the inductor 202 at $t_4$ completing the third burst of energy to the load 108 in the buck-boost mode. Although not shown in FIG. 4, this last burst of energy drives the regulated voltage past the sleep threshold, causing the control circuit 106 to force the voltage regulator 102 into the sleep mode by opening all the switches in the switching circuit 106.

The voltage regulator 102 remains in the sleep mode until the regulated voltage drops below the wake-up threshold at $t_5$. When this occurs, the control circuit 110 operates the switching circuit 106 in the buck mode because the input voltage 402 from the unregulated voltage source 104 is now higher than the regulated voltage 302 output from the voltage regulator 102. In the buck mode, the control circuit 110 closes the first and fourth switches 204, 207, and opens the second and third switches 205, 206 in the switching circuit 106 during the first phase of the cycle. As a result, the voltage $V_L$ across the inductor 202 changes instantaneously to $(V_{in}-V_{out})$, causing current in the inductor 202 to ramp up at a rate that is proportional to the inductor voltage divided by the inductance, or $[(V_{in}-V_{out})/L]$. In this case, the current takes longer to ramp up to the peak current $I_{peak}$, as compared to the boost mode or buck-boost mode, because some of the energy from the unregulated voltage source 104 is being diverted to load 108. This results in a more efficient transfer of energy because the unregulated voltage source 104 is connected directly to the load 108 through the inductor 202. Once the inductor 202 reaches the peak current $I_{peak}$, the energy stored in the inductor 202 may be transferred to the output of the voltage regulator 102 during the second phase of the cycle by opening the first switch 204 and closing the second switch 205. When this occurs, the voltage across the inductor 202 changes instantaneously to $-V_{out}$ to maintain current flow. The inductor current decreases at a rate that is proportional to the inductor voltage divided by the inductance $(-V_{out}/L)$ until there is no longer any current flowing through the inductor. As shown in FIG. 4, this process is repeated twice until the regulated voltage 302 exceeds its regulated value at $t_6$.

Figure 5:
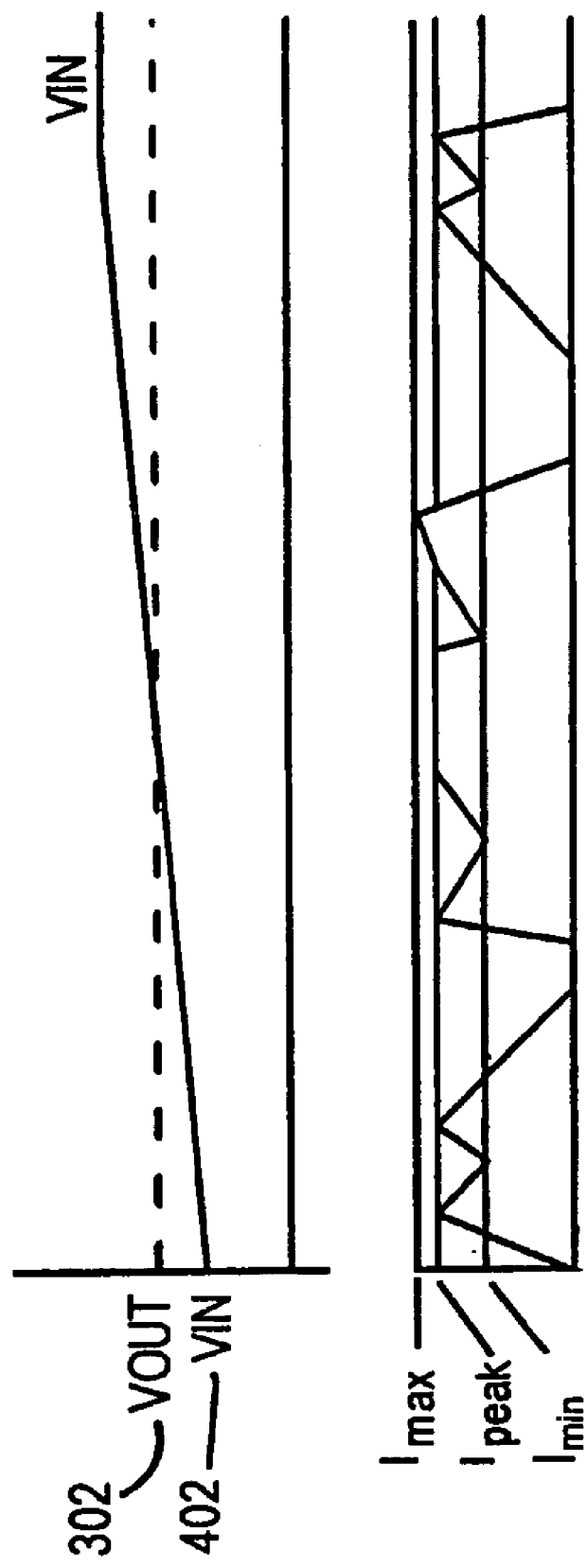
FIG. 5 is a timing diagram illustrating the operation of yet another embodiment of a buck-boost voltage regulator in the hysteretic mode.

FIG. 5 is a timing diagram illustrating the operation of yet another embodiment of a voltage regulator in the hysteretic mode. In this example, the inductor current is not completely discharged to zero current in the second phase of each cycle in the hysteretic mode. Instead, a new cycle is initiated when the current flowing through the inductor drops to some minimum current $(I_{min})$.

Referring to FIGS. 2 and 5, two energy bursts are used in the boost mode to drive the regulated voltage 302 above the sleep threshold. The inductor current is ramped up to the peak current $I_{peak}$ in the first phase of each cycle. Once this occurs, the control circuit 110, in the second phase of each cycle, opens the third switch 206 and closes the fourth switch 207, while the first switch 204 remains closed and the second switch 205 remains open, causing the voltage across the inductor to change instantaneously to maintain current flow. The current flowing through the inductor decreases until it reaches the minimum current $I_{min}$, causing the switching circuit 106 to begin a new cycle by closing the third switch 206 and opening the fourth switch.

The operation of the voltage regulator 102 is similar in the buck-boost mode. In each cycle, the inductor current is ramped up to the peak current $I_{peak}$ in the first phase of each cycle. Once this occurs, the control circuit 110, in the second phase of each cycle, opens the third switch 206 and closes the fourth switch 207, while the first switch 204 remains closed and the second switch 205 remains open, causing the voltage across the inductor to change instantaneously to maintain current flow. The current flowing through the inductor decreases until it reaches the minimum current $I_{min}$, causing the switching circuit 106 to begin a new cycle by closing the third switch 206 and opening the fourth switch. The primary difference is that in the first cycle of the buck-boost mode, the minimum inductor current $I_{min}$ is reached while the unregulated voltage source 104 is connected directly to the load 108 through the inductor 202, whereas in the second and third cycles, the minimum current $I_{min}$ is reached after the unregulated voltage source 104 is removed from the load. However, if the rate of discharge of the inductor current during the first cycle is higher, because, for example, the difference between the input and output voltage is greater, then the minimum current $I_{min}$ may also be reached after the unregulated voltage source 104 is removed from the input of the voltage regulator 102.

In the buck mode, the inductor current is ramped up in the first phase of each cycle until it reaches the peak current $I_{peak}$. Once this occurs, the control circuit 110, in the second phase of each cycle, opens the first switch 204 and closes the second switch 205, while the third switch 206 remains open and the fourth switch 207 remains closed, causing the voltage across the inductor to change instantaneously to maintain current flow. The current flowing through the inductor decreases until it reaches the minimum current $I_{min}$, causing the switching circuit 106 to begin a new cycle by closing the first switch 204 and opening the second switch 205.

By using a minimum current level above zero to begin the next cycle, more output current may be provided to the load in the hysteretic mode for the same peak current $I_{peak}$. Alternatively, a fixed time period for the second phase of each cycle may be used. In at least one embodiment of the voltage regulator, the peak current $I_{peak}$ may be adjustable depending on the load current demands. At higher load currents, the peak current $I_{peak}$ could be linearly varied or stepped up to provide more output current capability.

Figure 6:
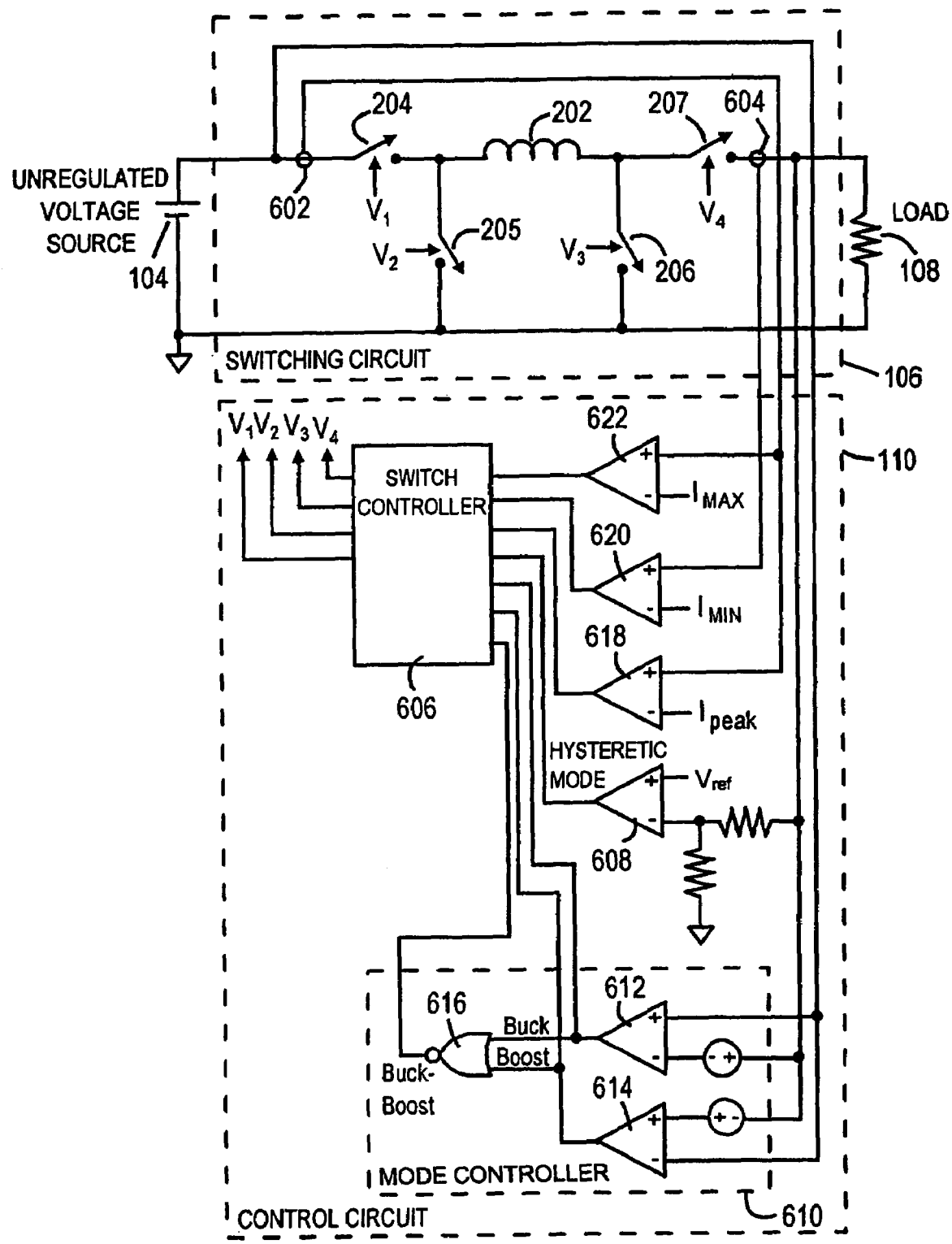
FIG. 6 is a schematic block diagram of an embodiment of a switching circuit and control circuit operating in a buck-boost voltage regulator.

FIG. 6 is a schematic block diagram of an embodiment of a switching circuit and control circuit operating in a voltage regulator in the hysteretic mode. The switching circuit 106 is basically the same as that described in connection with FIG. 2 with the addition of an inductor current sensor. The inductor current sensor includes an input current sensor 602 between the unregulated voltage source 104 and the first switch 204, and an output current sensor between the fourth switch 207 and the load 108.

The control circuit 110 may include a switch controller 606 that provides the control signals ($V_1$, $V_2$, $V_3$, $V_4$) to operate the switches 204-207 in the switching circuit 106. The control signals may be generated by the switch controller 606 based on whether the voltage regulator is asleep or awake. When the voltage regulator 102 is in the sleep mode, the switch controller 606 may be used to generate control signals that open the switches 204-207 in the switching circuit 106 so that the voltage regulator 102 goes into a low current state. When the voltage regulator 102 is awake, the switch controller 606 may be used to generate control signals to operate the switches 204-207 in any manner described earlier in connection with FIGS. 2-5, or any other manner consistent with the principles described herein. A voltage comparator 608 may be used to determine whether to operate the voltage regulator in the sleep mode by comparing the regulated voltage at the output of the voltage regulator 102 to a reference voltage. The voltage comparator 608 may be designed with hysteresis to prevent the voltage regulator from intermittently waking up and going back to sleep when the regulated voltage is close to its regulated value.

When the switch controller 606 determines that the voltage regulator is awake from the output of the voltage comparator 608, it generates control signals to operate the switches 204-207 in the switching circuit 106 based on whether the voltage regulator is in the buck, boost, or buck-boost mode. The mode of operation may be determined by a mode controller 610 that compares the input voltage from the unregulated voltage source 104 to the regulated voltage at the output of the voltage regulator 102. The mode controller 610 may include a first comparator 612 that determines whether the voltage regulator 102 is in the buck mode, and a second comparator 614 that determines whether the voltage regulator 102 is in the boost mode. By adjusting the level of the regulated voltage provided to the first and second comparators 612, 614, a hysteresis band may be established in which the output of the first comparator 612 indicates that the voltage regulator 102 is not operating in the buck mode, and the output of the second comparator 614 indicates that the voltage regulator 102 is not operating in the boost mode. A NOR gate 616 may be used to detect this condition, and provide a signal to the switch controller 606 indicating that the voltage regulator 102 should operate in the buck-boost mode.

Once the switch controller 606 determines the sequencing of the switches 204-207 in the switching circuit 106 from the outputs of the mode controller 610, the timing of the switches 204-207 may be determined from the inductor current sensor in the switching circuit 106. A peak current detector 618 may be used to compare the output of the input current sensor 602 in the switching circuit 106 to a reference current value. The peak current detector 618 may be used to determine when the inductor 202, coupled to the unregulated voltage source 104 through the first switch 204, reaches the peak current $I_{peak}$. When this occurs, the switch controller 606 generates control signals to operate the switches 204-207 in the switching circuit 106 to transfer energy from the inductor 202 to the load 108. A minimum current detector 620 may be used to compare the output of the output current sensor 604 in the switching circuit 106 with a reference current value. The minimum current detector 620 may be used to indicate to the switch controller 606 when to end the current cycle. The reference current value to the minimum current detector 620 may be set to zero current or any other value. The peak current $I_{peak}$ may be adjusted by varying the reference current value to the peak current detector 618.

The switch controller 606 may also have an internal timer (not shown) to control the time period in which a direct connection between the unregulated power source 104 and the load 108 is maintained through the first and fourth switches 204, 207 in the buck-boost mode. A maximum current detector 622 may be used to compare the output of the output current sensor 604 (or the input current sensor 602) in the switching circuit 106 with a reference current value. The maximum current detector 620 may be used to indicate when the current through the inductor has reached a maximum value when the inductor current is increasing during the second phase of any cycle. Internal logic (not shown) in the switch controller 106 may be used to determine when to terminate the direct connection between the unregulated voltage source 104 and the load 108 under this condition based on the maximum inductor current or the expiration of the internal timer, whichever occurs first.

The switch controller 106 may also include a second internal timer (not shown). The second internal timer may be used by the switch controller 106 to terminate each cycle, rather than using the minimum current detector 620.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A voltage regulator having an input and output, comprising:
   a switching circuit having an inductive element and switches configured to switch the inductive element to the input and output of the voltage regulator; and
   a control circuit configured to operate the switches in a buck, boost, or buck-boost mode,
   wherein the control circuit is responsive to a signal indicating whether the voltage regulator is in the buck, boost or buck-boost mode to determine timing of the switches in accordance with current in the inductive element, and
   the control circuit is further configured to set the switches into predetermined states so as to place the voltage regulator into a sleep mode in response to a rise in the output voltage of the voltage regulator beyond a threshold voltage.

2. The voltage regulator of claim 1 wherein the control circuit is further configured to operate the switches in cycles in each of the buck, boost and buck-boost modes, each of the cycles having a first phase with the inductive element coupled to the input, followed by a second phase with the inductive element coupled to the output, with the input of the voltage regulator being coupled to the output of the voltage regulator through the inductive element during a portion of each of the cycles.

3. The voltage regulator of claim 2 wherein the duration of the first and second phases of each of the cycles is a function of the current flowing through the inductive element.

4. The voltage regulator of claim 2 wherein the control circuit is further configured to operate the switches to couple the input of the voltage regulator to the output of the voltage regulator through the inductive element during the first phase of each of the cycles in the buck mode, and operate the switches to couple the input of the voltage regulator to the output of the voltage regulator through the inductive element during the second phase of each of the cycles in the boost mode.

5. The voltage regulator of claim 2 wherein the second phase of each of the cycles comprises a first portion followed by a second portion, the control circuit being further configured to operate the switches to couple the input of the voltage regulator to the output of the voltage regulator during the first portion of the second phase of each of the cycles in the buck-boost mode.

6. The voltage regulator of claim 5 wherein the control circuit is further configured to operate the switches to terminate the first portion of the second phase of each of the cycles when a fixed time duration from the beginning of the second phase expires or the current flowing through the inductive element reaches a threshold current, whichever occurs first following the beginning of the second phase.

7. The voltage regulator of claim 5 wherein the control circuit is further configured to operate the switches to terminate the first portion of the second phase of each of the cycles when a fixed time duration from the beginning of the second phase expires, the current flowing through the inductive element drops to a first threshold current, or the current flowing through the inductive element reaches a second threshold current higher than the first threshold current, whichever occurs first following the beginning of the second phase.

8. The voltage regulator of claim 2 wherein the control circuit is further configured to operate the switches to terminate the first phase of each of the cycles when the current flowing through the inductive element reaches a threshold current.

9. The voltage regulator of claim 8 wherein the threshold current is adjustable.

10. The voltage regulator of claim 8 wherein the control circuit is further configured to operate the switches to terminate the second phase of each of the cycles when the current flowing through the inductive elements falls to a second threshold current lower than the threshold current.

11. The voltage regulator of claim 10 wherein the second threshold current level is zero current.

12. The voltage regulator of claim 8 wherein the control circuit is further configured to operate the switches such that the second phase of each of the cycles has a fixed time duration.

13. The voltage regulator of claim 1 wherein the inductive element comprises an inductor.

14. A method of operating a voltage regulator to produce a regulated voltage at its output from a voltage source, the voltage regulator having an inductive element, the method comprising:
transferring energy from the voltage source to the output of the voltage regulator using an inductive element and switches in a buck, boost or buck-boost mode;
in response to determining whether the energy is transferred in the buck, boost or buck-boost mode, determining timing of the switches in accordance with current in the inductive element;
detecting a rise in the output voltage of the voltage regulator beyond a threshold voltage; and
setting the switches into predetermined states so as to force the voltage regulator into a sleep mode only in response to the detected rise in the output voltage of the voltage regulator beyond the threshold voltage.

15. The method of claim 14 wherein the energy is transferred from the voltage source to the output of the voltage regulator in cycles in each of the buck, boost, and buck-boost modes, each of the cycles having a first phase followed by a second phase, and wherein the energy is transferred from the voltage source to the output of the voltage regulator by coupling the voltage source to the inductive element during the first phase of each of the cycles, and coupling the inductive element to the output of the voltage regulator during the second phase of each of the cycles, with the voltage source being coupled to the output of the voltage regulator through the inductive element during a portion of each of the cycles.

16. The method of claim 15 wherein the duration of the first and second phases of each of the cycles is a function of the current flowing through the inductive element.

17. The method of claim 15 wherein the voltage source is coupled to the output of the voltage regulator through the inductive element during the first phase of each of the cycles in the buck mode, and the voltage source is coupled to the output of the voltage regulator through the inductive element during the second phase of each of the cycles in the boost mode.

18. The method of claim 15 wherein the energy is transferred from the voltage source to the output of the voltage regulator by terminating the first phase of each of the cycles when the current flowing through the inductive element reaches a threshold current.

19. The method of claim 18 further comprising adjusting the threshold current.

20. The method of claim 18 wherein the energy is transferred from the voltage source to the output of the voltage regulator by terminating the second phase of each of the cycles when the current flowing through the inductive element falls to a second threshold current lower than the threshold current.

21. The method of claim 20 wherein the second threshold current is zero current.

22. The method of claim 18 wherein the energy is transferred from the voltage source to the output of the voltage regulator during the second phase of each of the cycles having a fixed time duration.

23. The method of claim 14 wherein the inductive element comprises an inductor.

24. The method of claim 14 wherein the energy is transferred from the voltage source to the output of the voltage regulator in cycles, each of the cycles including a first phase with the voltage source coupled to the inductive element followed by a second phase with the inductive element coupled to the output of the voltage regulator, the second phase of each of the cycles having a first portion with the voltage source coupled to the output of the voltage regulator through the inductive element followed by a second portion.

25. The method of claim 24 wherein the energy is transferred from the voltage source to the output of the voltage regulator by terminating the first portion of the second phase of each of the cycles when a fixed time duration from the beginning of the second phase expires or the current flowing through the inductive element reaches a threshold current, whichever occurs first following the beginning of the second phase.

26. The method of claim 24 wherein the energy is transferred from the voltage source to the output of the voltage regulator by terminating the first portion of the second phase of each of the cycles when a fixed time duration from the beginning of the second phase expires, the current flowing through the inductive element falls to a first threshold current, or the current flowing through the inductive element reaches a second threshold current higher than the first threshold current, whichever occurs first following the beginning of the second phase.

27. A voltage regulator having an input and output, comprising:
a switching circuit having an inductive element and switches configured to switch the inductive element to the input and output of the voltage regulator; and
a control circuit comprising means for operating the switches in buck, boost, or buck-boost mode,
wherein the control circuit is responsive to a signal indicating whether the voltage regulator is in the buck, boost or buck-boost mode to determine timing of the switches in accordance with current in the inductive element, and
the control circuit is further configured to set the switches into predetermined states so as to place the voltage regulator into a sleep mode in response to a rise in the output voltage of the voltage regulator beyond a threshold voltage.

28. A voltage regulator having an input and output, comprising:
a switching circuit having an inductive element, and switches including a first switch between the input of the voltage regulator and one end of the inductive element, a second switch between the one end of the inductive element and a voltage return line, a third switch between the other end of the inductive element and the voltage return line, and a fourth switch between the other end of the inductive element and the output of the voltage regulator; and
a control circuit having a mode controller configured to operate the switches in buck, boost, or buck-boost mode,
wherein the control circuit is responsive to the mode controller indicating whether the voltage regulator is in the buck, boost or buck-boost mode to determine timing of the switches in accordance with current in the inductive element, and
the control circuit is further configured to set the switches into predetermined states so as to place the voltage regulator into a sleep mode in response to a rise in the output voltage of the voltage regulator beyond a threshold voltage.

29. The voltage regulator of claim 28 wherein the switching circuit further comprises an inductive element current sensor, and wherein the control circuit is further configured to operate the switches in cycles, each of the cycles having a first phase with the first switch closed, followed by a second phase with the fourth switch closed, with the first and fourth switches being closed at the same time during a portion of each of the cycles, and wherein the duration of the first and second phases of each of the cycles is a function of the current sensed by the inductive element current sensor.

30. The voltage regulator of claim 29 wherein the control circuit is further configured to close the fourth switch during both the first and second phases of each of the cycles in the buck mode, and close the first switch during both the first and second phases of each of the cycles in the boost mode.

31. The voltage regulator of claim 29 wherein the second phase of each of the cycles comprises a first portion followed by a second portion, the control circuit being further configured to close both the first and fourth switches during the first portion of the second phase of each of the cycles in the buck-boost mode.

32. The voltage regulator of claim 31 wherein the control is further configured to close the third switch during the first phase of each of the cycles in the buck-boost mode, and close the second switch during the second portion of the second phase of each of the cycles during the buck-boost mode.

33. The voltage regulator of claim 32 wherein the control circuit is further configured to open the second and fourth switches during the first phase of each of the cycles during the buck-boost mode, open the second and third switches during the first portion of the second phase of each of the cycles during the buck-boost mode, and open the first and third switches during the second portion of the second phase of each of the cycles during the buck-boost mode.

34. The voltage regulator of claim 28 wherein the inductive element comprises an inductor.

35. A voltage regulator having an input and output, comprising:
a switching circuit having an inductive element and switches configured to switch the inductive element to the input and output of the voltage regulator; and
a control circuit configured to operate the switches in a buck-boost mode,
wherein the control circuit is responsive to a signal indicating that the voltage regulator is in the buck-boost mode to determine timing of the switches in accordance with current in the inductive element, and
the control circuit is further configured to set the switches into predetermined states so as to place the voltage regulator into a sleep mode in response to a rise in the output voltage of the voltage regulator beyond a threshold voltage.

36. The voltage regulator of claim 35 wherein the control circuit is further configured to operate the switches in cycles, each of the cycles having a first phase with the inductive element coupled to the input of the voltage regulator, followed by a second phase with the inductive element coupled to the output of the voltage regulator, the second phase of each of the cycles having a first portion with the input of the voltage regulator coupled to the output of the voltage regulator through the inductive element followed by a second portion.

37. The voltage regulator of claim 36 wherein the duration of the first and second phases of each of the cycles is a function of the current flowing through the inductive element.

38. The voltage regulator of claim 36 wherein the control circuit is further configured to operate the switches to terminate the first portion of the second phase of each of the cycles when a fixed time duration from the beginning of the second phase expires or the current flowing through the inductive element reaches a threshold current, whichever occurs first following the beginning of the second phase.

39. The voltage regulator of claim 36 wherein the control circuit is further configured to operate the switches to terminate the first portion of the second phase of each of the cycles when a fixed time duration from the beginning of the second phase expires, the current flowing through the inductive element drops to a first threshold current, or the current flowing through the inductive element reaches a second threshold current higher than the first threshold current, whichever occurs first following the beginning of the second phase.

40. The voltage regulator of claim 36 wherein the control circuit is further configured to operate the switches to terminate the first phase of each of the cycles when the current flowing through the inductive element reaches a threshold current.

41. The voltage regulator of claim 40 wherein the threshold current is adjustable.

42. The voltage regulator of claim 40 wherein the control circuit is further configured to operate the switches to terminate the second phase of each of the cycles when the current flowing through the inductive elements falls to a second threshold current lower than the threshold current.

43. The voltage regulator of claim 42 wherein the second threshold current is zero current.

44. The voltage regulator of claim 36 wherein the control circuit is further configured to operate the switches such that the second phase of each of the cycles has a fixed time duration.

45. The voltage regulator of claim 35 wherein the inductive element comprises an inductor.

* * * * *

UNITED STATES PATENT AND TRADEMARK OFFICE
CERTIFICATE OF CORRECTION

| | | |
|---|---|---|
| PATENT NO. | : 7,265,524 B2 | Page 1 of 1 |
| APPLICATION NO. | : 10/939469 | |
| DATED | : September 4, 2007 | |
| INVENTOR(S) | : Mark Jordan et al. | |

It is certified that error appears in the above-identified patent and that said Letters Patent is hereby corrected as shown below:

On the title page of the Letter Patent, under section (54), change "INDUCER" to -- INDUCTOR --

Under column 1, line 1, change "INDUCER" to -- INDUCTOR --

Signed and Sealed this

Twenty-seventh Day of November, 2007

JON W. DUDAS
*Director of the United States Patent and Trademark Office*